United States Patent
Wagenmaker

(10) Patent No.: US 10,762,399 B2
(45) Date of Patent: Sep. 1, 2020

(54) USING DEEP VIDEO FRAME PREDICTION FOR TRAINING A CONTROLLER OF AN AUTONOMOUS VEHICLE

(71) Applicant: Ford Global Technologies, LLC, Dearborn, MI (US)

(72) Inventor: Andrew Wagenmaker, Okemos, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 333 days.

(21) Appl. No.: 15/846,006

(22) Filed: Dec. 18, 2017

(65) Prior Publication Data
US 2019/0188542 A1    Jun. 20, 2019

(51) Int. Cl.
*G01C 22/00* (2006.01)
*G05D 1/00* (2006.01)
(Continued)

(52) U.S. Cl.
CPC .............. *G06K 9/66* (2013.01); *G05D 1/0088* (2013.01); *G05D 1/0246* (2013.01);
(Continued)

(58) Field of Classification Search
CPC .... G06K 9/66; G06K 9/00805; G06K 9/6256; G06K 9/6273; G06K 9/00791;
(Continued)

(56) References Cited

U.S. PATENT DOCUMENTS 9,760,806 B1    9/2017  Ning
2017/0236052 A1  8/2017  Israelsson
(Continued)

FOREIGN PATENT DOCUMENTS

| EP | 3219564 A1 | 9/2017 |
|---|---|---|
| WO | WO-2016156236 A1 | 10/2016 |
| WO | WO-2017158058 A1 | 9/2017 |
| WO | WO-2017165627 A1 | 9/2017 |

OTHER PUBLICATIONS

"Interpretable Learning for Self-Driving Cars by Visualizing Causal Attention" by Jinkyu Kim and John Canny Computer Science Division; University of California, Berkeley; publication date: Mar. 30, 2017 (Year: 2017).*

(Continued)

*Primary Examiner* — Harry Y Oh
*Assistant Examiner* — Sohana Tanju Khayer
(74) *Attorney, Agent, or Firm* — David R. Stevens; Stevens Law Group

(57) ABSTRACT

An image predictor is trained to produce a predicted image based on N preceding images captured by a vehicle camera and vehicle controls. A discriminator is trained to distinguish between an image following P preceding images in an image stream and one that is not a subsequent image. A control generator generates estimated controls based on a set of N images and the estimated controls and set of N images are input to the image predictor. A predicted image and the set of N images are input to the image predictor which outputs a value indicating whether the predicted image is accurate. A loss function based on this value and a difference between the vehicle controls and the estimated controls for the set of N images is used as feedback for training the control generator.

20 Claims, 5 Drawing Sheets

(51) Int. Cl.
*G06K 9/66* (2006.01)
*G06N 3/04* (2006.01)
*G06N 3/08* (2006.01)
*G05D 1/02* (2020.01)
*G06K 9/62* (2006.01)
*G06K 9/00* (2006.01)

(52) U.S. Cl.
CPC ....... *G06K 9/00805* (2013.01); *G06K 9/6256* (2013.01); *G06K 9/6273* (2013.01); *G06N 3/04* (2013.01); *G06N 3/08* (2013.01)

(58) Field of Classification Search
CPC ...... G05D 1/0088; G05D 1/0246; G06N 3/04; G06N 3/08; G06T 2207/30261; G06T 2207/30252; G06T 2207/20081; G06T 2207/20084
See application file for complete search history.

(56) References Cited

U.S. PATENT DOCUMENTS

| | | | |
|---|---|---|---|
| 2018/0012082 A1* | 1/2018 | Satazoda | G06K 9/00805 |
| 2018/0293453 A1* | 10/2018 | Viswanathan | G06K 9/00791 |
| 2018/0336424 A1* | 11/2018 | Jang | B60W 40/04 |
| 2019/0171223 A1* | 6/2019 | Liang | G05D 1/0088 |

OTHER PUBLICATIONS

"Moving Vehicle Detection with Convolutional Networks in UAV Videos" by Youyang Qu, Liang Jiang, and Xinping Guo, 2016 The 2nd International conference on control, Automation and Robotics. (Year: 2016).*

End-to-end Learning of Driving Models from Large-scale Video Datasets, University of California, Berkeley, Mar. 13, 2017.

* cited by examiner ns in memory device(s) 204

USING DEEP VIDEO FRAME PREDICTION FOR TRAINING A CONTROLLER OF AN AUTONOMOUS VEHICLE

BACKGROUND

Field of the Invention

This invention relates to control algorithms for autonomous vehicles.

Background of the Invention

Recent successes in deep learning have motivated the application of it to a variety of vision based problems relevant to autonomous driving. In particular, several recent works have developed deep learning based framework for end-to-end driving of autonomous vehicle. For example, given a dashcam image, prior approaches produce steering and speed commands to drive the car.

The system and methods disclosed herein provide an improved approach for training an image-based control algorithm for an autonomous vehicle.

BRIEF DESCRIPTION OF THE DRAWINGS

In order that the advantages of the invention will be readily understood, a reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
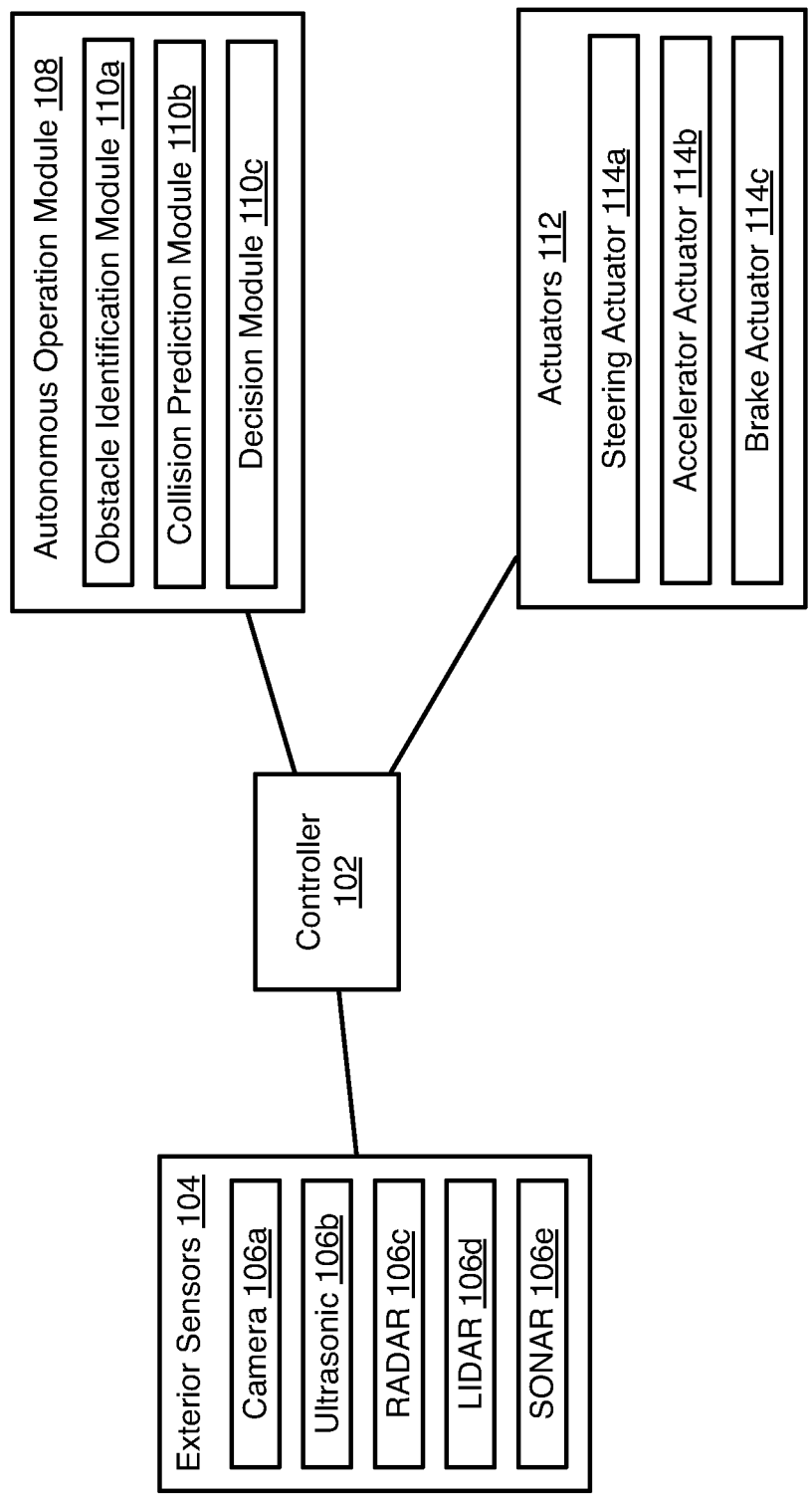
FIG. 1 is a schematic block diagram of components implementing an autonomous vehicle for use in accordance with an embodiment of the present invention.

Referring to FIG. 1, a vehicle used according to the methods disclosed herein may be may be a small capacity vehicle, such as sedan or other small vehicle or a large capacity vehicle such as a truck, bus, van, large sport utility vehicle (SUV), or the like. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, a controller 102 of the vehicle may perform autonomous navigation and collision avoidance. The controller 102 may receive one or more outputs from one or more exterior sensors 104. For example, one or more cameras 106a may be mounted to the vehicle and output image streams received to the controller 102.

The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art.

Figure 2:
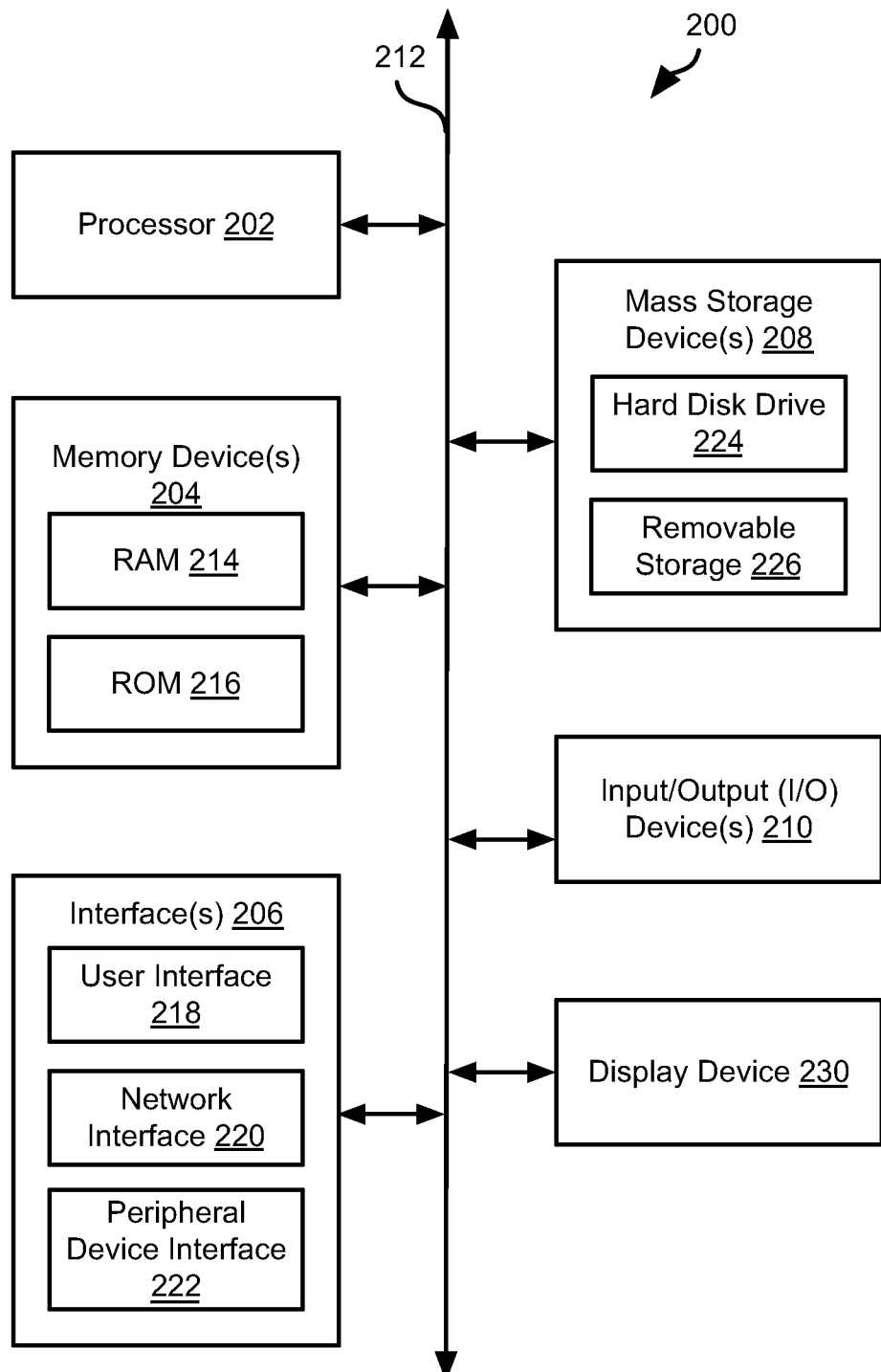
FIG. 2 is a schematic block diagram of an example computing device.

FIG. 2 is a block diagram illustrating an example computing device 200. Computing device 200 may be used to perform various procedures, such as the methods 400-600 described below. The vehicle controller 102 may also have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
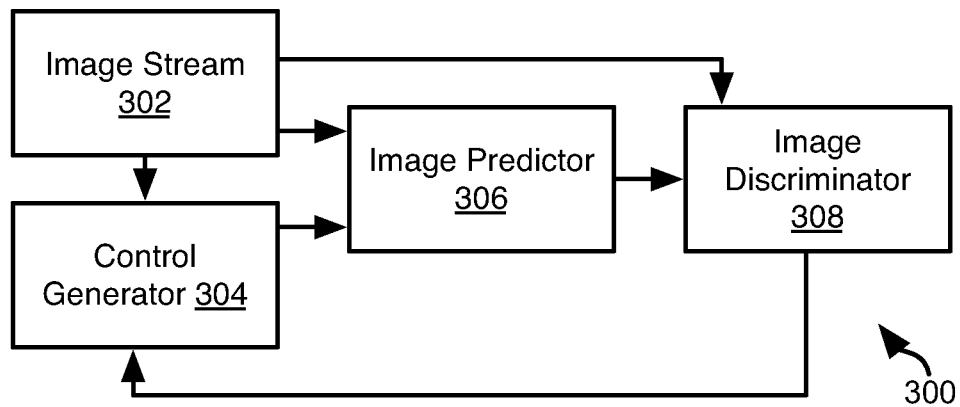
FIG. 3 is a process flow diagram of components for implementing an image-based control algorithm in accordance with an embodiment of the present invention.

Referring to FIG. 3, while achieving a reasonable level of success, prior approaches to training a machine learning model using video captured by a vehicle camera have suffered from the issue of compounding error. With a large training set of videos and corresponding driving commands produced by human drivers, the networks succeed in correctly predicting driving commands for situations similar to those in the training set. However, when the machine learning model is given control of the vehicle, small errors in the predictions it produces can eventually lead it into states not represented in the training set, for instance, driving on the shoulder. Since the machine learning model has not been trained to handle such situations, it has a difficult time recovering. This issue limits the applicability of such behavior-cloning based approaches.

The architecture 300 illustrated in FIG. 3 provides an improved approach to image-based machine learning that reduces the impact of compounding error. The architecture 300 takes as an input an image stream 302. The image stream 302 may include outputs of one or more cameras 106a mounted to one or more vehicle and having the vehicle's exterior in their field of view. The image stream 302 may be input to a control generator 304. The control generator 304 may be a machine learning model such as a deep neural network (DNN), convolution neural network, or other type of neural network or machine learning approach.

The control generator 304 may be trained using captured control inputs and video data according to any approach known in the art, such as control inputs to vehicles from human drivers along with simultaneously captured video of cameras mounted to the vehicles. In particular, the control generator 304 is trained to produce one or more control outputs for a given set of images from the image stream 302. For example, a set of N contiguous images, where N is an integer greater than one and may be on the order of 10 to 30 images. The control outputs may be commands to any of the actuators 112.

The control outputs of the control generator 304 may be input to an image predictor 306 along with the image stream. For example, for N contiguous images used to generator a control input, those same N images and the control input may be input as an input data set to the image predictor. Alternatively, the N images input to the image predictor 306 may be offset from the N images used to make the control input to account for delays in the impact of a control input on the image stream.

The image predictor 306 is a machine learning model that is trained to take as input a set of contiguous images from an image stream and predict what the image immediately following the set of contiguous images will be in the image stream. The number of images may be N, where N is an integer greater than one and may be on the order of 10 to 30. N may be equal to or different from the value of N used to generate the control input.

Recent work in deep learning has demonstrated that it is possible to accurately predict future video frames based on motion observed in previous frames that are conditioned on actions. Accordingly, any of these approaches may be used to train the image predictor 306. The image streams used to train the image predictor 306 may be the same as or different from the image streams used to train the control generator 304.

The predicted image of the image predictor 306 and the set of contiguous images for which the predicted images was generated may be input to an image discriminator 308. The image discriminator 308 outputs one of two values, where one value, e.g., 0, indicates that the predicted image is unsatisfactory or inaccurate and the other value, e.g., 1, indicates that the predicted image is satisfactory or otherwise accurate. The manner in which the image discriminator is trained is described below with respect to FIG. 5.

The output of the image discriminator 308 may be fed back to the control generator 304. In particular, since the predicted image is based, in part, on the control input from the control generator, a control input that produces a satisfactory predicted image is a positive outcome whereas one that does not is a negative outcome. Accordingly, each control input and the corresponding output of the image discriminator 308 may be used to further train the control generator 304.

As a result of this process, the control generator 304 is trained to produce control inputs that are sufficient to "fool" the image discriminator 308 that is trained to distinguish between actual images in an image stream and erroneous images in an image stream, as described below. As the control generator 304 is trained to produce predicted images that are found satisfactory by the image discriminator 308, the control generator 304 learns to produce commands that will yield a future state represented in the training data set, i.e. the image streams from vehicle cameras. This will help ensure that, when controlling the car, the control generator doesn't drive the vehicle into regions where it is no longer able to make accurate predictions and reducing or eliminating the "compounding errors" problem.

Once trained, the control generator 304 can be deployed on an actual vehicle to produce control commands to actuators 112 for the car based on live video outputs of one or more cameras 106a.

Figure 4:
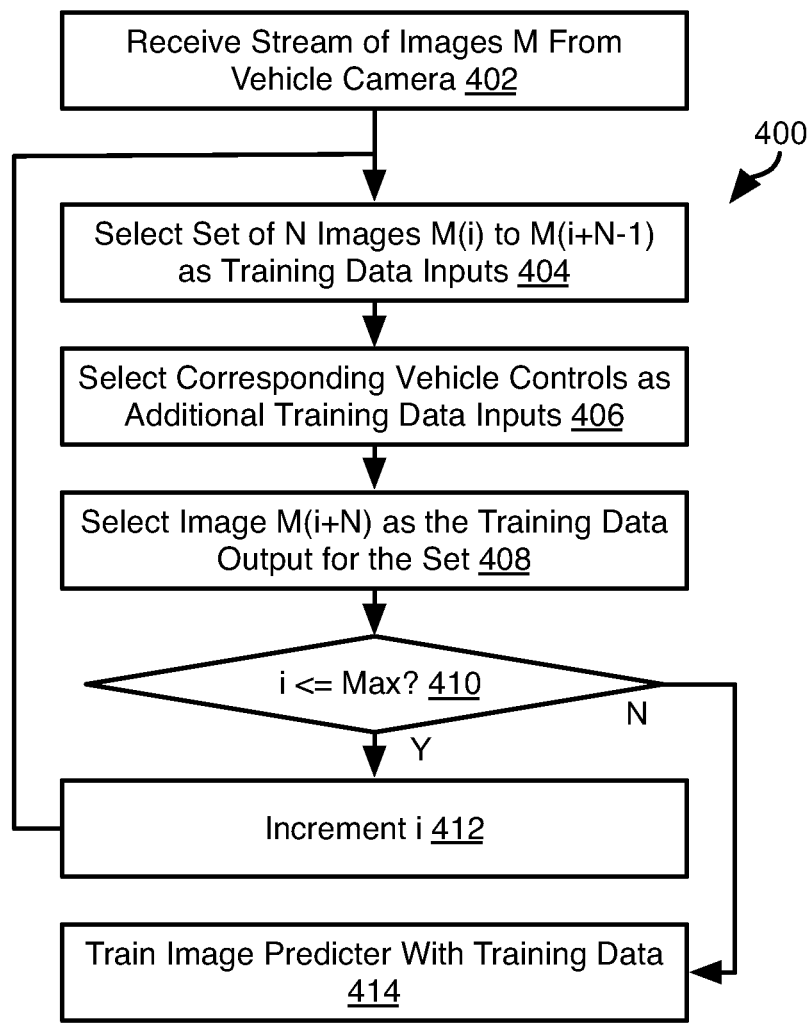
FIG. 4 is a process flow diagram of a method for training an image predictor in accordance with an embodiment of the present invention.

FIG. 4 illustrates a method 400 for training the image predictor 306. The method 400 may include receiving 402 a stream of images M from a vehicle camera 106a.

Starting with an initial value of i, where i is an index of an image within the image stream, the method 400 may include selecting 404 a set of N contiguous images M(i) to M(i+N−1) from the image stream as a training data input for a training data set. The initial value of i may be selected to be zero or may be selected to be some other value, i.e. such that a number of initial frames of an image stream are ignored. The value of N is selected such that there are a sufficient number of frames. For example, N may be a value of between 5 and 30. In some instances, a value of N from 10-15 is sufficient. The value of N may be dependent on the frame rate of the image stream. For example, with a faster frame rate, more images are relevant to the generation of a predicted image. For a slower frame rate, selecting more images provides a smaller benefit since the earliest images will be further in time from the last image and therefore not as relevant to the predicted image.

The method 400 may include selecting 406 corresponding vehicle controls for the image M(i) to M(i+N−1). Vehicle controls may include driver inputs as well as one or more variables describing the state of a vehicle during the time period in which the images M(i) to M(i+N−1) were received. For example, vehicle controls may include a steering angle input, braking input, accelerator input as well as state variables such as some or all of translational speed, acceleration, yaw angle velocity, yaw angular acceleration, pitch angular velocity, pitch angular acceleration, roll angular velocity, roll angular velocity, or the like as measured by on-board sensors of the vehicle capturing the image stream. The vehicle controls may have times of receipt by a vehicle controller that are the same as or different from the time of receipt of the images M(i) to M(i+N−1) to account for delays in processing and vehicle response to driver inputs. The image predictor 306 is trained to predict a next image based on past images and the vehicle controls. Accordingly, the vehicle controls may include the values of the vehicle controls having times of receipt corresponding most closely to and prior to the time of receipt of the last image of the image set (M(i+N+1) in order to account for non-equal sampling rates and processing delays.

The method 400 may include selecting 408 an image M(i+N) as the training data output for the training data set. In this manner, the image predictor 306 is trained to generate a predicted image based on vehicle controls and past images. In some embodiments, the image predictor 306 may be trained to generate multiple predicted images. Accordingly, images M(i+N) to M(i+N+A) may be selected 408 as the training data output, where A is a value greater than one. In general, at most two to three images may be predicted with accuracy. However, with a sufficient number of training data sets and computational power, more predicted images may be generated.

The method 400 may include evaluating 410 whether i is greater than or equal to a maximum value Max, i.e., whether there are sufficient remaining image frames in the image stream to generate another training data set. For example, Max may be equal to number of frames in the image stream minus N+1.

If i is less than or equal to Max, then i may then be incremented 412. For example, i may be incremented by one at each iteration. In other embodiments, a greater increment value may be used such as a value from two to N. The size of the increment value may depend on the amount of available image streams. For example, a greater diversity of training data sets may be obtained by using a larger increment size but requires longer and more image streams to generate enough training data sets. Processing may then continue at step 404.

If the value of i is not less than or equal to Max, the method 400 may continue to step 414 where a machine learning model is trained 414 using the training data sets. In particular, inputs for each training data set include the images M(i) to M(i+N−1) and the vehicle controls and the desired output for each training data set is the image M(i+N). The machine learning model used may be according to any machine learning approach known in the art. Neural networks, such as a deep neural network (DNN) or convolution neural network (CNN) are particularly suitable for use as the machine learning model.

In some embodiments, the image predictor 306 may be trained with multiple streams of images, which may be from multiple vehicles and for multiple trips in the any one vehicle. Accordingly, steps 402-412 may be repeated for each of these images streams until a sufficient number of training data sets are obtained. For example, the number of training data sets may be on the order of many thousands or multiple millions.

Figure 5:
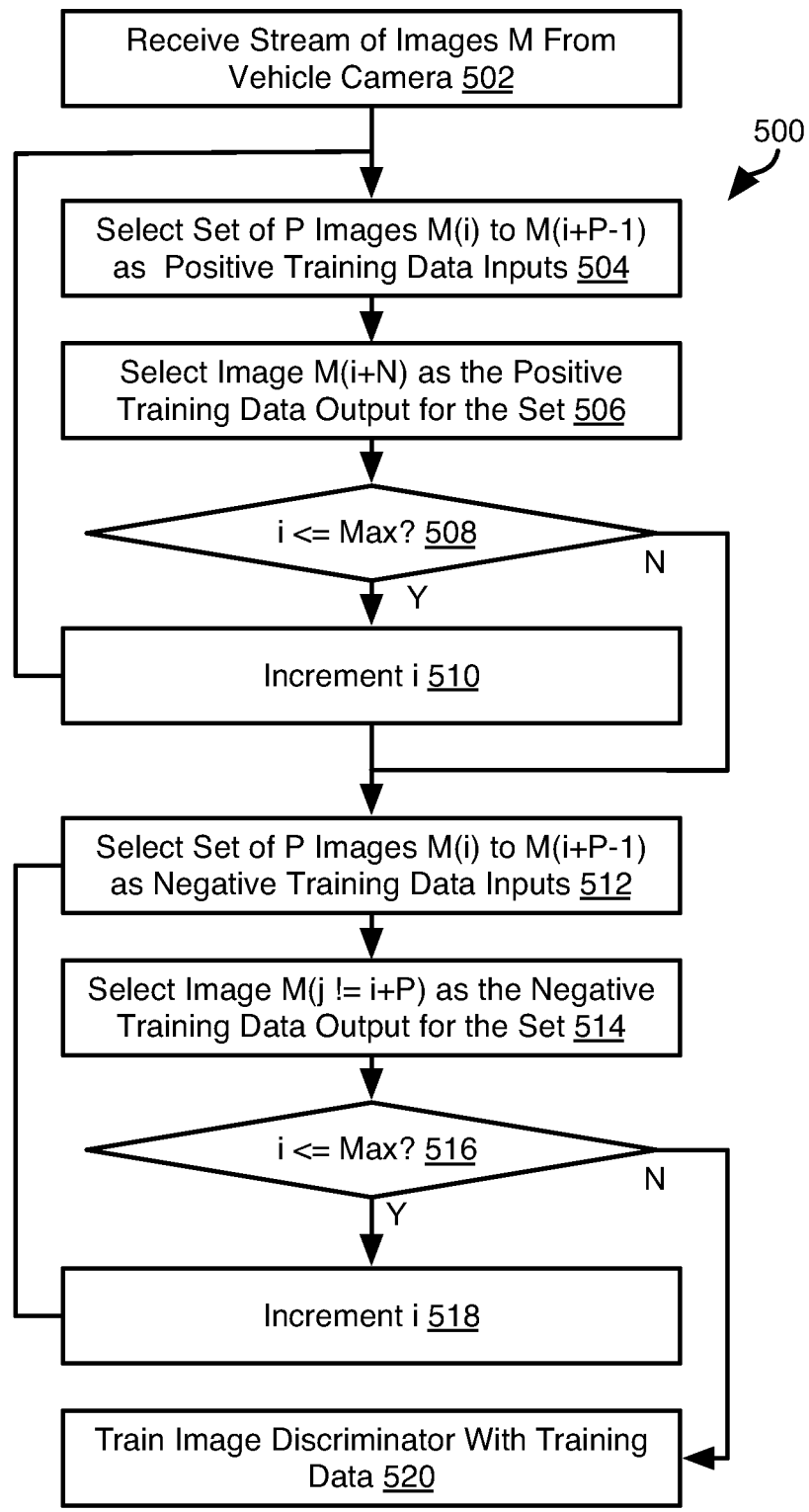
FIG. 5 is a process flow diagram of a method for training an image discriminator in accordance with an embodiment of the present invention.

FIG. 5 illustrates a method 500 for training the image discriminator 308. The method 500 may include receiving 502 a stream of images M from a vehicle camera 106a. The image stream used may include the same image stream or image streams used to train the image predictor 306 according to the method 400.

Starting with an initial value of i, where i is an index of an image within the image stream, the method 500 may include selecting 504 a set of P contiguous images M(i) to M(i+P−1) from the image stream as a training data input for a training data set. The initial value of i may be selected to be zero or may be selected to be some other value, i.e. such that a number of initial frames of an image stream are ignored. The value of P is selected such that there are a sufficient number of frames. For example, N may be a value of between 5 and 30. In some instances, a value of P from 10-15 is sufficient. The value of P may be dependent on the frame rate of the image stream. For example, with a faster frame rate, more images are relevant to the generation of a predicted image. For a slower frame rate, selecting more images provides a smaller benefit since the earliest images will be further in time from the last image and therefore not as relevant to the predicted image. The value of P may be the same as or different from the value of N used for the method 400.

The method 500 may include selecting 506 an image M(i+P) as a positive training data output for the training data set. In some embodiments, the image discriminator 308 may be trained to characterize multiple predicted images. Accordingly, images M(i+P) to M(i+N+B) may be selected 506 as the training data output, where B is a value greater than one. The value of B may be the same as the value of A from the method 400.

The method 500 may include evaluating 508 whether i is greater than or equal to a maximum value Max, i.e., whether there are sufficient remaining image frames in the image stream to generate another training data set. For example, Max may be equal to number of frames in the image stream minus P+1.

If i is less than or equal to Max, then i may then be incremented 510. For example, i may be incremented by one at each iteration. In other embodiments, a greater increment value may be used such as a value from two to P. The size of the increment value may depend on the amount of available image streams. For example, a greater diversity of training data sets may be obtained by using a larger increment size but requires longer and more image streams to generate enough training data sets. Processing may then continue at step 504.

If i is not less than or equal to Max, then processing continues at step 512 with the generation of multiple negative training data sets, each indicating an incorrect output for a particular input image set. The image stream used to generate negative training data sets may be the same or different from the image stream used to generator positive training data sets according to steps 502-510.

For example, starting at an initial value of i, e.g. 0 or some other value, the method 500 may include selecting 512 a set of P images M(i) to M(i+P−1) for a training data set in the same manner as for step 504 and possibly from the same image stream or image streams.

However, an image M(j) may be selected as the output for the training data set for images M(i) to M(i+P−1), where j is not equal to i+P. For example, j may be selected to be i+P+X, where X is a positive or negative integer such that Abs(X) is greater than or equal to one. In some embodiments, Abs(X) is greater than or equal to two. In some embodiments, X is selected as a random positive or negative integer that is bounded by some constraint, such as 1<Abs(X)<Q. Q may be selected to be any value desired by a user. For example, a value between three and 20. In some embodiments, only positive values of X are used, such that only skipping forward in the image frame is permitted The negative output selected for step 514 is preferably such that the discriminator 308 will be trained to identify subtle errors in the output of the image predictor 306. Accordingly, the value of X is preferably frequently selected to be small, e.g., either one or two, in order to generate negative outputs that are only subtly incorrect. In some instances, such as where a vehicle is stopped, a number of sequential images may be substantially identical. Accordingly, the image selected at step 512 may be constrained to be different than a last image of the set of images M(i+P−1) by a threshold amount, such as using a mean pixel difference or some other metric of difference between images. Accordingly, where this threshold is not met, the negative training data output may be selected from further forward or further back in the image stream until the difference is met or generation of training data for that set of images M(i) to M(i+P−1) may be omitted.

If the value of i is found 516 to be less than or equal to Max, then i is incremented 518, such as described above with respect to step 510 and processing continues at step 512. In some embodiments, the value of Max for step 516 is greater than for step 508, such as Max+X.

If the value of i is found 516 to be greater than Max, the method 500 may continue to step 520 where a machine learning model is trained 520 using the positive and negative training data sets. In particular, inputs for each training data set include the images M(i) to M(i+P−1) and either an image M(i+P) as a desired output or an image M(j) as a negative result. The machine learning model used at step 520 may be according to any machine learning approach known in the art. The machine learning model may be a generative adversarial network (GAN). Neural networks, such as a deep neural network (DNN) or convolution neural network (CNN) may also be suitable for use as the machine learning model.

As for the method 400, the image discriminator 308 may be trained with multiple streams of images, which may be from multiple vehicles and for multiple trips in the any one vehicle. Accordingly, steps 502-518 may be repeated for each of these images streams until a sufficient number of training data sets are obtained. For example, the number of training data sets may be on the order of many thousands or multiple millions.

The illustrated method 500 for generating training data sets is exemplary only. In the above method, each image stream is twice processed to generate positive training data set and negative training data sets. In alternative approach, separate image streams are used for the positive and negative training data sets. In another approach, positive and negative training data sets are selected randomly from the same image stream, e.g. for a particular set of P images, whether a subsequent image is selected as a positive desired output or a non-sequential image is selected as a negative output may be determined randomly while incrementing through the image stream or image streams.

Figure 6:
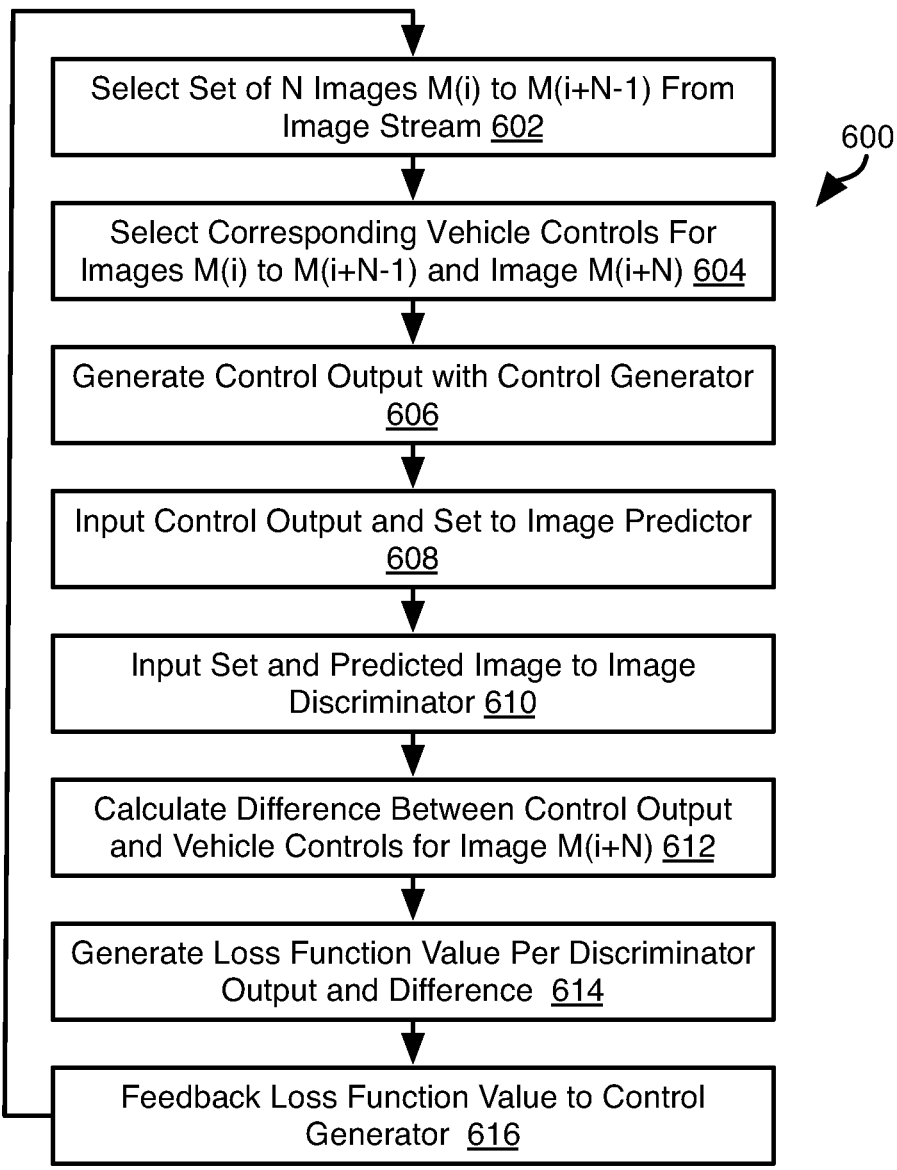
FIG. 6 is a process flow diagram of a method for training a control generator in accordance with an embodiment of the present invention.

FIG. 6 illustrates a method 600 for training the control generator 304 using the image predictor 306 and the image discriminator 308 as trained according to the methods 400 and 500. The control generator 304 may be initialized or created prior to execution of the method 600 according to a conventional approach of image-based training. In other embodiments, the control generator 304 is not initially trained prior to execution of the method 600.

The method 600 may include selecting 602 a set of N images M(i) to M(i+N−1) from an image stream, which may be the same image stream or one of the same image streams as for the methods 400 and 500. The value of i may be selected to be an initial value of zero or some other value as for the methods 400 and 500. The value of N may be the same as or different from the value of N for the method 400.

The method 600 may include selecting 604 vehicle controls corresponding to images M(i) to M(i+N−1) in the same manner as for step 406 of the method 400. The method 600 trains the control generator 304 to output vehicle controls for a given set of input images. According the vehicle controls maybe selected for image M(i+N) in the same manner as for step 406 of the method 400. In particular, the vehicle controls received prior to and closest to the time of receipt of the image M(i+N) may be selected 604, with adjustments for delays in processing or for the effect of vehicle controls to be reflected in an image output of a vehicle camera.

The method 600 may include generating 606 a control output with the control generator 304. In particular, the images M(i) and M(i+N−1) may be input to the control generator, which then outputs a control output based on the images. In some embodiments, vehicle controls corresponding to images M(i) and M(i+N−1) may also be input with the images. The control output from step 606 may be a control output that would correspond in time to the last image M(i+N−1). The control output may include some or all of a steering angle output, a braking output, and an acceleration output.

The control output of step 606 and a set of images M(i) to M(i+N−1) may then be input 608 to the image predictor 306, which then outputs a predicted image. The set of images M(i) to M(i+N−1) may then be input 610 to the image discriminator 308, which produces an output. The output is either a first value, e.g., 1, indicating that the predicted image is accurate or a second value indicating that the predicted image is inaccurate, e.g., 0.

The method 600 may further include calculating 612 a difference between the control output from step 606 and the actual vehicle controls corresponding to the set of images M(i) to M(i+1) from step 604. In other words, the ability of the control generator 304 to mimic the human-operator's control inputs is evaluated at step 612. The output of step 612 is a value that increases with the difference between the actual vehicle controls and the control outputs. As noted above, the vehicle controls and control output from the control generator 304 may include multiple controls such as steering, braking, and acceleration controls. Accordingly, the difference at step 612 may include separate difference values for each of these controls or a single value that is an aggregation of the differences for each of these controls, e.g. sum of the absolute values or a weighted sum of the absolute values of these differences. Any other aggregation function may also be used, such as RMS (root mean squared) or some other function.

A loss function value may then be generated 614 that is a function of the magnitude of the difference output from step 612 and the output of the discriminator from step 610. In particular, the loss function value increases with increase in the difference output from step 612 and when the output of the discriminator is the value indicating an incorrect predicted image. For example, these values may be adjusted, scaled and summed according to a predetermined function that provides a desired increase with increase in the difference from step 612 and when the discriminator indicates that the predicted image is inaccurate.

The loss function value from step 614 may then be fed back 616 to the control generator 304. The loss function indicates to the control generator 304 how accurate the control output of step 606 was. Accordingly, the machine learning model used to train the control generator may use this as training data to improve the accuracy of the control generator 304 and reduce the loss function value over many iterations of the method 600.

The method 600 may then repeat with the selection 602 of another set of images from the image stream. As for the other methods disclosed herein, multiple image streams from the same or different vehicles may be used. Accordingly, the method 600 may repeat until multiple image streams have been processed. As for the methods 400 and 600, the value of i in each iteration for an image stream may be incremented by one or by some other value, such as N, for each iteration following an initial iteration.

Note that the method 600 and the method 500 may be performed simultaneously such that the control generator 304 and image discriminator 308 are trained and used at the same time.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a computing device:
   for each set of images of sets of images, inputting the each set of images to a control generator and receiving a corresponding control input for the each set of images from the control generator in response to the each set of images;
   for each set of images of the set of images, inputting the each set of images to an image predictor along with the corresponding control input for the each set of images, the image predictor outputting a predicted image for the each set of images and the corresponding control input for the each set of images;
   for each set of images of the sets of images, inputting the each set of images and the predicted image for the each set of images into a discriminator; and
   using an output from the discriminator for each set of images as feedback to the control generator.

2. The method of claim 1, wherein each set of images is a contiguous set of images from an output of a camera mounted to a vehicle.

3. The method of claim 1, wherein the output from the discriminator for each set of images is one of two values, a first of the two values indicating a positive outcome and a second of the two values indicating a negative outcome.

4. The method of claim 1, wherein the corresponding control input for each set of images is a steering angle.

5. The method of claim 1, wherein the corresponding control input for each set of images is at least one of a steering angle, acceleration input, and braking input.

6. The method of claim 1, wherein the image predictor, discriminator, and control generator are each a deep neural network model.

7. The method of claim 1, wherein the image predictor, discriminator, and control generator are each a convolution neural network model.

8. A system comprising one or more processing devices and one or more memory devices operably coupled to the one or more processing devices, the one or more memory devices storing executable code effective to cause the one or more processing devices to:
   for each set of images of sets of images, input the each set of images to a control generator and receive a corresponding control input for the each set of images from the control generator in response to the each set of images;
   for each set of images of the set of images, input the each set of images to an image predictor along with the corresponding control input for the each set of images, the image predictor programmed to output a predicted image for the each set of images and the corresponding control input for the each set of images;
   for each set of images of the sets of images, input the each set of images and the predicted image for the each set of images into a discriminator; and
   use an output from the discriminator for each set of images as feedback to the control generator.

9. The system of claim 8, wherein the each set of images is a contiguous set of images from an output of a camera mounted to a vehicle.

10. The system of claim 9, wherein the output from the discriminator for each set of images is one of two values, a first of the two values indicating a positive outcome and a second of the two values indicating a negative outcome.

11. The system of claim 9, wherein the corresponding control input for each set of images is a steering angle.

12. The system of claim 9, wherein the corresponding control input for each set of images is at least one of a steering angle, acceleration input, and braking input.

13. The system of claim 9, wherein the image predictor, discriminator, and control generator are each a deep neural network model.

14. The system of claim 9, wherein the image predictor, discriminator, and control generator are each a convolution neural network model.

15. A method comprising, by a computing device:
receiving a first image stream from a first camera mounted to a first vehicle, the first image stream captured in a first time period;
receiving a first control input stream for the first vehicle, the first control input stream captured during the first time period and including inputs received from a driver of the first vehicle;
generating first training data sets, each training data set including
N contiguous images from the first image stream, where N is an integer greater than one,
one or more control inputs from the first control input stream corresponding temporally to the first image stream, and
an image immediately following the N contiguous images in the first image stream of the each training data set;
training an image predictor using the first training data sets;
generating second training data sets, each training data set including
P contiguous images from a second image stream, where P is one of equal and not equal to N, the second image stream being either the same or different from the first image stream,
an image that is one of (a) not an image immediately following the N contiguous images in the second image stream of the each training data set and (b) the image immediately following the P contiguous images in the second image stream of the each training data set; and
a desired output that is a first value if(a) is true and a second value if(b) is true; and
training an image discriminator according to the second training data sets; and
training a control generator using outputs of the image discriminator.

16. The method of claim 15, wherein training the control generator comprises:
receiving a third image stream that is one of the first image stream, a second image stream, and different image stream from the first and second image streams;
for each set of N contiguous images in the third image stream, generating a corresponding estimated control input;
inputting each set of N contiguous images from the third image stream and the estimated control input corresponding to the each set of N contiguous images from the third image stream into the image predictor to obtain a predicted image for the each set of N contiguous images from the third image stream;
inputting each set of N contiguous images from the third image stream and the predicted image for the each set of N contiguous images from the third image stream into the image discriminator to obtain a discriminator output for the each set of N contiguous images from the third image stream; and
further training the control generator using the discriminator output for each set of N contiguous images from the third image stream.

17. The method of claim 16, wherein further training the control generator using the discriminator output comprises:
for each set of N contiguous images, generating a loss function value that increases when the discriminator output is the first value and increases with magnitude of a difference between an estimated control input output by the control generator in response to each set of N contiguous images and one or more control inputs from the first control input stream corresponding to the each set of N contiguous images; and
training the control generator to reduce the loss function value.

18. The method of claim 16, wherein the corresponding control input for each set of images from the third image stream is at least one of a steering angle, acceleration input, and braking input.

19. The method of claim 16, wherein the image predictor, image discriminator, and control generator are each a deep neural network model.

20. The method of claim 16, wherein the image predictor, image discriminator, and control generator are each a convolution neural network model.

* * * * *